Sept. 11, 1962

W. D. BAINES 3,053,425

STABILIZATION OF A FLAT BAND RUNNING
OVER A CYLINDRICAL ROLLER

Filed Sept. 14, 1959

Inventor
William D. Baines

By Stevens, Davis, Miller & Mosher
Attorneys

Sept. 11, 1962

W. D. BAINES 3,053,425

STABILIZATION OF A FLAT BAND RUNNING
OVER A CYLINDRICAL ROLLER

Filed Sept. 14, 1959

Inventor
William D. Baines
By Stevens, Davis, Miller & Mosher
Attorneys

United States Patent Office 3,053,425
Patented Sept. 11, 1962

3,053,425
STABILIZATION OF A FLAT BAND RUNNING OVER A CYLINDRICAL ROLLER
William D. Baines, Cardinal Heights P.O., Ontario, Canada, assignor to National Research Council, Ottawa, Ontario, Canada, a body corporate of Canada
Filed Sept. 14, 1959, Ser. No. 839,728
1 Claim. (Cl. 226—3)

The invention is directed towards improvements in the stabilization of a band running freely over a cylindrical roller.

There are many industrial applications of bands running over rollers in substantially synchronous engagement therewith, that is with little or no slip between the band and the roller. One example is an endless belt employed for the transmission of power, or the conveyance of materials. There are also many instances where it is necessary to cause bands of sheet-like material to pass over rollers in travelling from one part of a machine to another during a manufacturing operation. The making of paper is an example, and the improvement afforded by the present invention is particularly useful in the paper industry, because lack of transverse stability has been a constant source of trouble in the handling of fast travelling webs of paper. The fragile nature of the paper, especially when wet, renders it difficult to use guiding devices that contact the edges of the moving band of paper.

In an ideal assembly of a band running over a plurality of cylindrical rollers, the rollers would be perfectly aligned with one another and the band would be absolutely uniform in tension and other characteristics. There is no preferred lateral position for the band when in motion under these conditions. It should be possible for the band to run equally well in any position along the roller axes. In practice, however, it is virtually impossible under commercial conditions to ensure perfect parallelism of the various roller axes, and to avoid minor deviations in the rollers from a truly cylindrical shape. Even such minor factors produce instability in the travelling band, causing it to tend to migrate laterally across the rollers. If not checked the band will move steadily sideways until it runs off the ends of the rollers or touches stationary parts of the machine. The result will usually be a stoppage, or, at the very least, some impairment of the quality of the product.

It should be made clear that the present invention is restricted in its application to an arrangement in which a band runs freely over a rotating cylindrical roller, that is to say with an inherent freedom of transverse movement relative to the roller. The invention is not concerned with the winding of strip material in spiral fashion into a roll of superposed convolutions, or with the unwinding of strip material from such a roll, since, in either of these cases, each convolution is tethered to a substantial degree, as far as transverse movement is concerned, by its connection to the next convolution that is part of the roll. The band of material thus joining or leaving the roll does not have the same freedom to wander transversely. The problem involved in obtaining a roll with straight ends is basically one of feeding the strip material properly onto the roll, a problem with which the present invention is not concerned.

It is known that transverse shifting of a band along a roller with which it is in travelling engagement can be prevented by forming the roller with a central crown. However there are many applications where crowning of the roller is undesirable. Crowned rollers are substantially more difficult to manufacture than cylindrical rollers, and consequently more expensive. They are also undesirable when the band is fragile or stretchable in nature, because a crowned roller tends to cause stretching of the central region of the band relative to its edges, and this stretching can cause either rupture of the band or undesirable distortion sufficient to prevent the band later being formed into a cylindrical roll without wrinkling.

It is the principal object of the present invention to provide a solution to the problem outlined above and, more specifically, to provide means for inhibiting transverse motion of a band travelling freely over a cylindrical roller, even when minor deviations from symmetry in the system tend to give rise to such a motion.

It has now been discovered that control over transverse movement of such a band can be exercised by proper control of the relative longitudinal tensions in the central and edge strips of the band. It has further been discovered that the criteria for band stability in response to longitudinal tensions are different on the meeting and the parting sides of the assembly. The location on the roller where the band and the roller surface meet is referred to herein as the "meeting side," whereas the location where the band moves away from the roller is referred to as the "parting side." These locations are fixed in space, although both the roller surface and the band are moving. The band and the roller meet and part along transverse lines known as the "meeting line" and the "parting line" respectively, the angle between these lines subtended at the axis of the roller being the "angle of wrap."

In the typical examples with which the invention will be illustrated, the angle of wrap lies somewhere between 90° and 180°. The present invention will not be concerned with any angles of wrap exceeding 360°, because then the band would constitute a wound roll in the manner previously described and with which, as stated, the present invention is not concerned.

The discovery upon which the present invention is based is that, if the longitudinal tension in one longitudinal strip of the band is increased relative to the longitudinal tension in an adjacent longitudinal strip of the band, a lateral force is set up tending to cause the band to move transversely. On the meeting side, such lateral force is towards that strip of the band having less longitudinal tension, while on the parting side of the direction of the lateral force is towards that strip of the band having greater longitudinal tension.

The invention makes use of this discovery by distorting a portion of the band in the vicinity of the roller to set up differential longitudinal tensions between the central strip of such portion and the edge strips on each side of it, the sign of such differential tensions being such as to generate stabilizing transverse forces acting transversely on the band inwardly from the edge strips towards the central strip. On the parting side, this requires a higher tension along the central strip, for which reason the central strip is displaced from its normal plane. On the meeting side, a higher tension along the edge strips is required, so these are displaced either inwardly or outwardly.

For further understanding of these considerations, attention is directed to the accompanying drawings which illustrate a number of embodiments of the present invention.

In these drawings:

FIGURES 1 and 2 respectively show corresponding end and side diagrammatic views of a band and roller assembly according to a first form of the invention;

Figure 5:
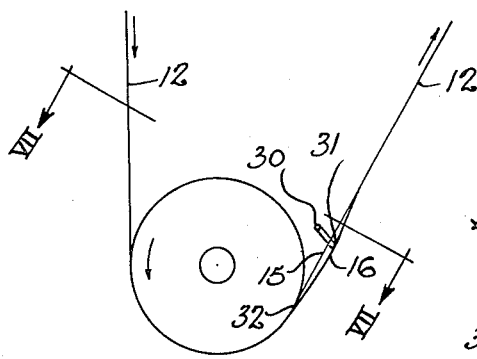
Figure 6:
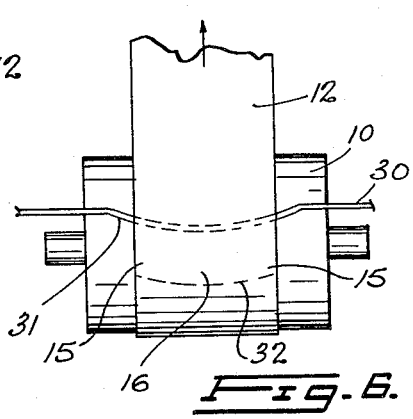
Figure 7:
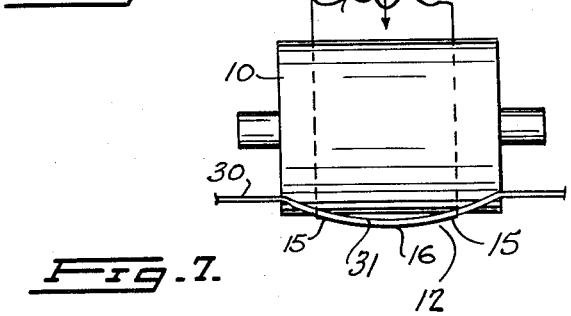
Figure 8:
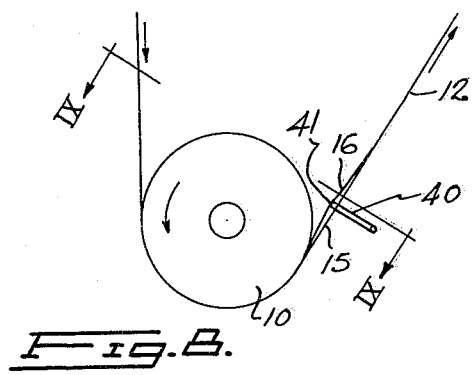
Figure 9:
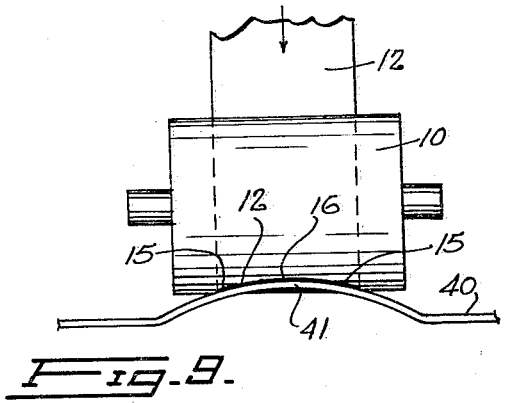
Figure 10:
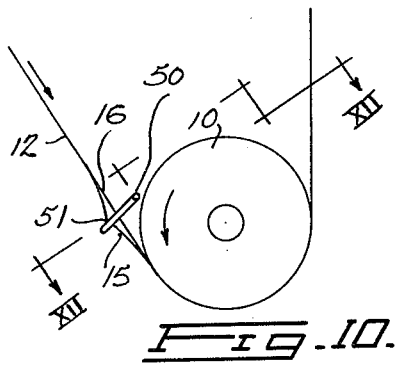
Figure 11:
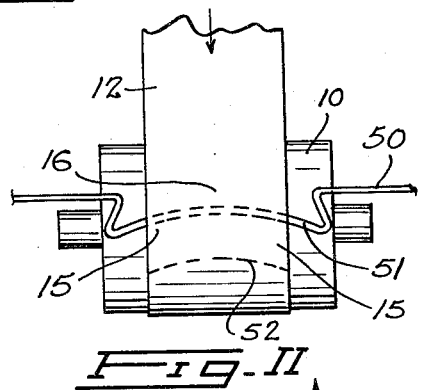
Figure 12:
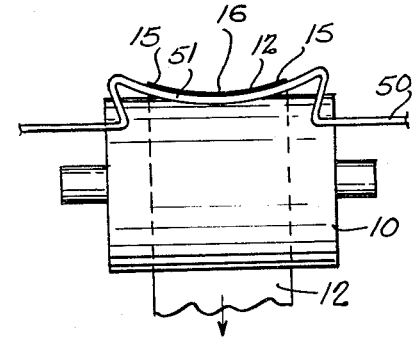
Figure 13:
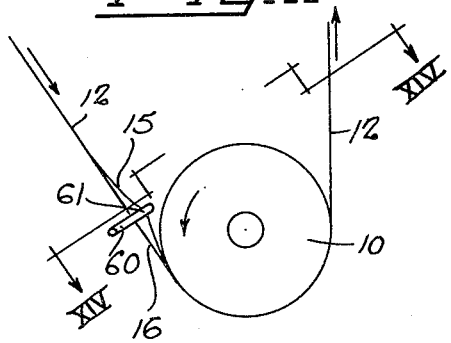

FIGURES 5 and 6 respectively show end and side diagrammatic views of a second roller and band assembly according to a further form of the present invention;

FIGURE 7 is a view of the parts of FIGURE 5 seen on the line VII—VII;

FIGURE 8 is an end diagrammatic view of a band and roller assembly according to another form of the invention;

FIGURE 9 is a section on the line IX—IX in FIGURE 8;

FIGURES 10 and 11 show corresponding end and side diagrammatic views of yet another band and roller assembly according to the invention;

FIGURE 12 is a section taken on the line XII—XII in FIGURE 10;

FIGURE 13 is an end view of still another embodiment of the invention; and

Figure 14:
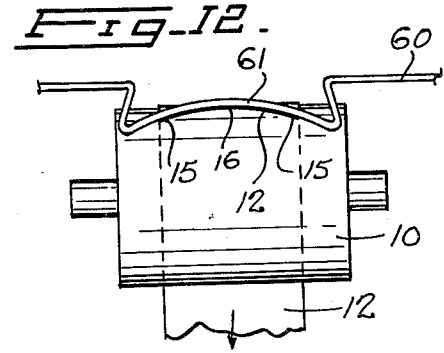

FIGURE 14 is a section taken on the line XIV—XIV in FIGURE 13.

Figure 1:
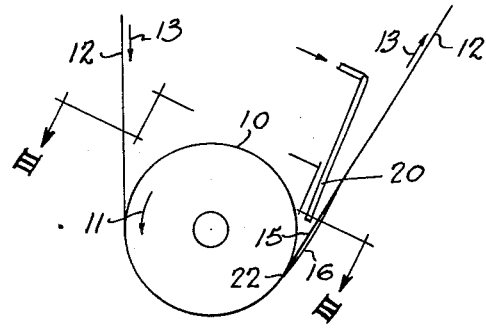
Figure 2:
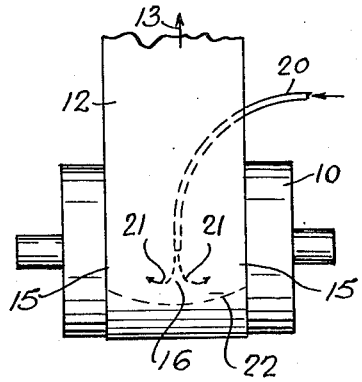
Figure 3:
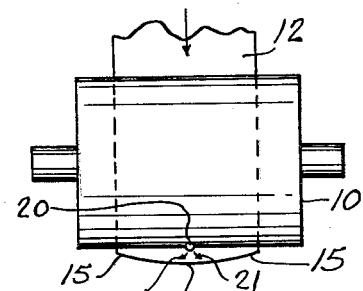
FIGURE 3 is a section on III—III in FIGURE 1.

Reference will first be made to FIGURES 1, 2 and 3 which show a cylindrical roller 10 that is rotated anticlockwise as seen in FIGURE 1 (arrow 11), over which roller a band 12 travels in the direction shown by arrows 13. The linear speeds of the surface of the roller 10 and of band 12 are assumed to be equal, that is to say here is no slippage.

The theory underlying the present invention requires that, on the parting side of the assembly, if transverse stability is to be achieved, the tension along the central strip of the band should be increased relative to the tension along the edge strips of the band. A first method of obtaining this effect is illustrated in FIGURES 1 to 3 which show an air pipe 20 projecting air 21 into the parting area where the band 12 separates from the roller 10. This air tends to curve outwardly the central longitudinal strip 16 of the band 12, and thus increases the longitudinal tension in the strip 16 in relation to that in the edge strips 15 which are substantially unaffected by the air. Instead of parting from the roller along a straight transverse line, the band 12 now parts from the roller along a curved parting line 22.

Figure 4:
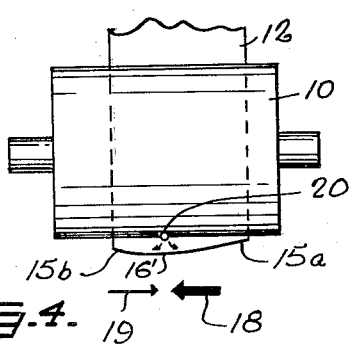
FIGURE 4 is a view similar to FIGURE 3 illustrating the conditions arising if the band is displaced transversely.

Now suppose that the band 12, as viewed in FIGURE 3, becomes displaced slightly towards the right hand side by some asymmetry in the roller system. This situation is shown in FIGURE 4. The difference between the longitudinal tension in the strip 16' which is now opposite the air pipe 20 and hence most tensioned and the longitudinal tension in the right hand edge strip 15a will now be greater than the difference in longitudinal tension between the strip 16' and the left hand edge strip 15b. Since, as above explained, it has been discovered that, on the parting side of the assembly, there is a lateral force exerted in the direction towards the area of greater longitudinal tension, forces will act on the band 12 as indicated by the arrows 18 and 19. Since the tension gradient between edge strip 15a and central strip 16' is greater than between edge strip 15b and central strip 16', the transverse force represented by the arrow 18 will be greater than that represented by the arrow 19. The force represented by the arrow 18 will thus predominate and tend to restore the band 12 to a central location; the system is thus stable. It will be appreciated that the forces represented by arrows 18 and 19 are present all the time. They are not generated only when the band is displaced laterally. They are present under the symmetrical conditions of FIGURE 3, when they are equal and opposite.

It should be noted in passing that, had conditions been reversed and the longitudinal tension in the edge strips been greater than the longitudinal tension in the central strip, the arrows 18 and 19 representing the forces, while being theoretically of the same magnitude, would have pointed outwardly and away from one another. Thus assuming an initial displacement to the right the predominating force (arrow 18) would have acted on the band to move it further to the right and conditions would have been unstable.

The velocity and volume of air required will depend on a number of circumstances. Normally, it will be desirable for the velocity of the air jet to be at least as great as the linear velocity of the band, but this may not always be essential. The width of the band, its weight and its rigidity will be factors that will have to be taken into account, as well, of course, as the magnitude of expected disturbing influences. If the band is normally running under comparatively stable conditions with only minor deviations from true uniformity, enough air to produce a shallow concavity in the band will be sufficient to ensure stability. On the other hand, if the system exhibits more substantial deviations from uniformity, a correspondingly greater degree of concavity will be necessary to provide sufficient tension differential to set up large enough stabilizing forces to overcome the unstabilizing influences and maintain proper operation. The volume and velocity will thus require to be determined in each case to obtain the desired degree of stability.

As demonstrated above, the band 12 will tend automatically to centre itself over the air jet so that any desired lateral shifting of the band 12 can be readily achieved by movement of the air pipe 20 across the roller.

FIGURES 5, 6 and 7 illustrate an alternative embodiment of the invention in which essentially the same concave distortion of the band 12 (as viewed from its inside surface) is produced. In this case the displacement of the central strip of the band is produced by physical contact with the band rather than by an air jet. This second method will be less preferred in cases where physical contact with the band is likely to give rise to damage or undue wear. There will, however, be many circumstances when light physical contact with the band can be tolerated. The second method will then have the advantage of requiring no supply of air. FIGURES 5, 6 and 7 show a rigid member 30 which has a convexly curved portion 31 bearing against the inside surface of the portion of the band 12 immediately disengaging from the roller 10, that is on the parting side, such portion 31 forcing the band 12 to separate from the roller 10 along a curved parting line 32 similar to the line 22. The central strip 16 of the band is again given a higher longitudinal tension than the edge strips 15. If friction between the band 12 and the portion 31 gives rise to more wear than can be tolerated, small rollers or other known anti-friction devices could be incorporated in the edge of the portion 31.

The embodiment of FIGURES 5 to 7 is essentially the same as that of FIGURES 1 to 3 in manner and theory of operation, the difference lying in the physical contact with the band rather than distortion of the band by air pressure.

In the embodiments of which a description follows, and which illustrate different ways of distorting the band, the invention has been shown in each case as employing physical distortion of the band with a rigid member. It is, however, to be understood, that the essence of the invention lies in distorting the band in various selected ways so as to give rise to differential longitudinal tensions, and that it is a matter of choice in each particular instance whether such distortion is effected by rigid physical means or by air pressure. It follows that an air jet, or jets, providing the same distortion of the band may be substituted for the physical member in each of the further embodiments described below.

FIGURES 8 and 9 will now be described. These illustrate a form of the invention in which the band is still distorted on the parting side of the roller. This embodiment differs, however, from those previously described in that the distorting member 40 has a convexly curved portion 41 which bears against the outside surface of the band 12 in the area where the band is immediately disengaging from the roller 10. The portion 41 pushes the central strip 16 of the band 12 inwardly towards the roller, instead of outwardly as in the previous embodiment. In this way the tension in the central strip 16 is increased relative to that in the side strips 15 with the same effect as before. That is there is a net stabilizing force acting on the band restoring it to a central position in relation to the curve of the portion 41.

Thus, summarising the embodiments so far discussed in which the distortion of the band has taken place on the parting side of the assembly, it can be said that the essential criterion for stability is that the central strip of the band should be displaced from its normal plane to have a higher longitudinal tension than the edge strips. Whether such greater central tension is obtained by acting on the inside surface of the band and pushing the central strip outwardly (FIGURES 1 to 7) or whether it is obtained by acting on the outside of the band and forcing the central strip inwardly (FIGURES 8 and 9) or in any other way is immaterial.

Embodiments of the invention will now be described in which the band is acted upon on the meeting side of the assembly, and here it will be seen that the situation is reversed in that the criterion for stability is that the longitudinal tension in the edge strips of the band should be greater than that in the central strip.

FIGURES 10 to 12 show a first embodiment of the invention in this category. A rigid member 50 having a concave portion 51 is positioned to push against the inside surface of the band 12 so that the edge strips 15 are displaced outwardly away from the roller 10 while the central strip 16 remains substantially unaffected. The edge strips are thus given an increased tension in relation to the central strip and the band 12 meets the roller along line 52. As stated above, the lateral force induced by a differential longitudinal tension on the meeting side of the roller has been found to act towards the region of less longitudinal tension. Thus, if the band 12 shown in FIGURES 10 to 12 becomes displaced laterally, the restoring forces would both act towards the centre since this is the region of less longitudinal tension. The force acting from the side to which the band has been displaced will be greater than the force action from the other side, since the differential tension will be greater, so that the net force will always be a restoring one giving rise to stable operation (analogously with the stability illustrated in FIGURE 4). Conversely, if a band on the meeting side of a roller were distorted to have a greater tension along the central strip, the transverse forces would act outwardly away from such strip and one such force would become cumulatively predominating so that conditions would be unstable.

Yet another embodiment of the invention is illustrated in FIGURES 13 and 14 which shows a member 60 having a concave portion 61 acting on the meeting side of the assembly but this time against the outside surface of the band 12. The band is thus distorted in the opposite direction from that shown in FIGURES 10 to 12 in that it now presents a concave face to the roller. It is not, however, the shape of the face presented to the roller which is critical but the relative longitudinal tensions, and the tension in the side strips 15 is still greater in this embodiment than in the central strip 16, which is the necessary condition for stability.

At first sight it might be thought that the invention is subject to the disadvantage mentioned above in connection with the use of a crowned roller, namely stretching of the central strip relatively to the edge strips or vice versa. It is true that some stretching may result from the concave and convex distortions which are an essential feature of the present invention, but such stretching will be small in comparison with that which will result from a crowned roller, because the displacing step is effected while the direction of travel of the band is maintained rectilinear. A crowned roller will stretch the central strip of the band for the full length of the portion of the band in contact with the roller, whereas with the present invention only a short length of the central or edge strips of the band is stretched. This advantage is especially significant when dealing with rollers of large diameter (as are commonly used in the paper industry) and when the angle of wrap is substantial, because the length of the portion of the band distorted in carrying out the present invention is then still comparatively small in relation to the portion of the circumference of the roller with which the band is in contact. It is thus small in comparison with the length of band which would be distorted if a crowned roller were employed. It will be understood that for ease of illustration the roller diameter shown in the accompanying drawings has been kept small. In many industrial applications the roller diameter will be many times greater than the length of the portion of band distorted in accordance with the present invention (the latter will normally only need to be a few inches to achieve sufficient differential tension).

The advantage which flows from the use of a cylindrical roller with separate distortion of the band, in comparison with a crowned roller which itself distorts the band, may be looked at another way. It is well known that paper, during its manufacture, cannot be run over crowned rollers. If it is, wrinkles and folds inevitably result, and these are presumably due to the lateral forces that, as the present inventor has found, act on the travelling band as soon as differential longitudinal tensions are set up. With distortion of the band on the parting side of the roller, as described in FIGURES 1 to 9 of the accompanying drawings, the distorted portion of the band is moving towards an area in which the longitudinal tensions in the band are uniform. That is, as soon as the band has passed the rigid member or air jet that causes the distortion, the tendency of the general longitudinal tension in the band is to pull it flat and discourage wrinkling. This is not so on a crowned roller, since the tendency to wrinkle at the area where the band first contacts the roller is aggravated rather than opposed by the subsequent areas of contact between band and roller which are similarly subjected to the same distortion. Generally the same theory as to the reason why the present invention is superior to the use of a crowned roller, is believed applicable to those embodiments of the invention in which the band is distorted on the meeting side of the roller (FIGURES 10 to 14). In this case the tendency to wrinkle set up by the distorting member of jet is largely neutralised by the uniform pull on the band which the cylindrical roller will exert.

There is, of course, the further advantage of the present invention that it is a great deal easier and cheaper to make cylindrical rollers to a comparatively high degree of precision, whereas the manufacture of a crowned roller with the same degree of precision is an undertaking of much greater complexity and expense.

It has been shown experimentally that the magnitude of the lateral stabilizing forces on which the present invention is based increases as the tension gradient increases, that is the tension differentials between the central strip and the edge strips. It was also found that, for a given tension gradient, the lateral stabilizing forces increase as the point of application of the displacing force that gives rise to the tension gradient is moved closer to the roller. It was thus deduced that the critical factor is the tension gradient along the actual meeting or parting line.

It was also determined experimentally that the performance is independent of the direction of power transfer between the roller and the band. That is to say, the same effect was observed whether the band served to drive the roller or the roller was employed to propel the band. These latter considerations would of course effect the difference between the mean longitudinal tension in the band on the meeting side and the mean longitudinal tension in the band on the parting side, but it became apparent that the value or sign of this difference has no effect on stability, the latter being essentially a function of the tension gradients in the transverse direction of the band.

This application is a continuation-in-part of application Serial No. 738,769 filed May 29, 1958 (now abandoned).

I claim:

In the operation of a system comprising a rotatably mounted roller having a straight axis of rotation and a truly cylindrical surface coaxial with said axis throughout the entire extent of said surface, and a normally flat travelling band running in substantially synchronous peripheral engagement over said roller surface with an inherent freedom of transverse movement relative thereto; the step of directing a jet of air against a longitudinally extending central strip only of the rectilinearly travelling portion of the band immediately disengaging from said roller surface on the parting side of said roller, said jet of air being of sufficient force to displace said central strip away from the roller surface and cause said band to part from said roller surface along a curved parting line concave in the direction of band travel.

References Cited in the file of this patent

UNITED STATES PATENTS

| | | |
|---|---|---|
| 236,068 | Newcomb | Dec. 28, 1880 |
| 625,342 | Lynch | May 23, 1899 |
| 887,428 | Rosendale | May 12, 1908 |
| 1,240,631 | Trier | Sept. 18, 1917 |
| 1,503,858 | Steiner | Aug. 5, 1924 |
| 1,569,064 | Archbald | Jan. 12, 1926 |
| 1,598,627 | Voegeli | Sept. 7, 1926 |
| 1,638,560 | Beveridge | Aug. 9, 1927 |
| 1,852,379 | Ruau | Apr. 5, 1932 |
| 2,454,021 | Wilson | Nov. 16, 1948 |
| 2,486,121 | Corn | Oct. 25, 1949 |
| 2,592,090 | Weaver | Apr. 8, 1952 |
| 2,916,767 | Stevens | Dec. 15, 1959 |
| 2,919,793 | Lorig | Jan. 5, 1960 |

FOREIGN PATENTS

| | | |
|---|---|---|
| 67,752 | Germany | Apr. 4, 1893 |